United States Patent [19]

Spencer

[11] 3,753,139

[45] Aug. 14, 1973

[54] COMBINED TEMPERATURE COMPENSATION AND ZERO-OFFSET CONTROL

[75] Inventor: William H. Spencer, Monrovia, Calif.

[73] Assignee: Bell & Howell Company, Chicago, Ill.

[22] Filed: May 13, 1971

[21] Appl. No.: 143,024

[52] U.S. Cl. .................. 330/69, 330/23, 330/30 D, 330/110

[51] Int. Cl. .................. H03f 3/36

[58] Field of Search .................. 330/23, 30 D, 69, 330/110; 307/310

[56] References Cited

UNITED STATES PATENTS

| | | | |
|---|---|---|---|
| 3,430,076 | 2/1969 | Overtverd | 330/23 X |
| 3,495,182 | 2/1970 | Smith et al. | 330/23 |
| 3,577,090 | 5/1971 | Montgomery | 330/69 |

OTHER PUBLICATIONS

Kengla et al., "Active Low-Pass Filter with Gain" IBM Technical Disclosure Bulletin, August 1967, pp. 344, 345.

Bakkes et al., "Temperature Compensated Current Source," IBM Technical Disclosure Bulletin, February 1966, p. 1289.

*Primary Examiner*—Roy Lake
*Assistant Examiner*—James B. Mullins
*Attorney*—Golove, Kleinberg & Morganstern

[57] ABSTRACT

A temperature compensating and zero-offset control circuit for an operational amplifier includes a floating diode in combination with a potentiometer. The diode exhibits a repeatable temperature coefficient which is a negative one at the anode and a positive one at the cathode. The zero-offset is accomplished by adjusting the dc level at which the diode floats with reference to the dc level of the amplifier. The output of the circuit is applied as one of the feedback inputs to the amplifier.

7 Claims, 3 Drawing Figures

PATENTED AUG 14 1973

3,753,139

INVENTOR.
WILLIAM H. SPENCER
BY
Dolan, Flamberg & Morgenstern
ATTORNEYS.

COMBINED TEMPERATURE COMPENSATION AND ZERO-OFFSET CONTROL

BACKGROUND OF THE INVENTION

1. Field of the Invention

The present invention relates to operational dc amplifiers and, more particularly, to a temperature compensating and zero-offset control circuit for such an amplifier.

2. Description of the Prior Art

One of the major problems encountered when using dc amplifiers in instrumentation applications is the effects of temperature changes on the zero offset of the amplifier. The usual method of compensating for thermal offset drift in discrete amplifiers is to insert small value of platinum wire-wound resistance in series with the emitter of one of the differential input pair of transistors. Although this has been the most satisfactory method of compensation devised to date, there are two distinct disadvantages attendant:

a. The compensating resistor is usually outside the potted module where it will detect a thermal shock before it reaches the input transistor, and a violent overcompensation results with a gradual drift back to the correct output voltage. This results in highly erroneous data resulting during periods of thermal shock.

b. Any attempt to incorporate a variable offset or variable gain control results in a change in the thermal characteristics of the amplifier, thus, spoiling the temperature compensation.

The prior art has also suggested compensating circuits for use with amplifiers; for example, the patent to N. C. Walker, et al. U.S. Pat. No. 3,185,932, issued May 25, 1965. That patent taught a method useful with a dual transistor input stage having a pair of input signal sources. A point of fixed potential was coupled to the two transistors so that a current path was provided through each of the transistors. The transistors were then interconnected so that the current in one of the paths is varied relatively to the current flowing in the other path so that the voltages appearing at the outputs were substantially equal.

Yet other approaches have been suggested in the prior art, including the provision of temperature-sensitive resistive elements, precision matching of components, and the provisions of controlled environments to minimize variations in temperature. One of the most popular methods has been the series connection of a temperature sensitive small platinum wire-wound resistive element in series with the emitter of one of a differential input pair of transistors. Unfortunately, the compensating resistive element frequently must be remote from the transistors which are usually "potted". Therefore, any changes in the thermal will wild be detected by the resistive element before the change affects the transistors. This results in a "leading" overcompensation whenever the thermal conditions change, resulting in a period of grossly inaccurate amplifier response.

Moreover, any attempts to incorporate a variable offset or variable gain control for the amplifier changes the thermal characteristics of the amplifier which, in turn, may defeat the temperature compensations. This method is wholly inapplicable to integrated circuit (IC) operational amplifiers since the first stage transistors are generally inacessible. Accordingly, it is necessary to find a new method which can be used with integrated circuit devices, whether in discrete operational amplifier modules or as part of a large scale (LSI) or medium scale (MSI) INTEGRATED CIRCUIT DEVICE.

SUMMARY OF THE INVENTION

It may be shown that a voltage divider network can be devised including a temperature sensitive element which can provide a signal to the feedback loop. Given any amplifier, the voltage dependency upon temperature can be ascertained and determined. A correcting network can then generate a compensating voltage which is temperature dependent.

One problem in such a compensating network would be whether the compensating signal should have a positive or negative "slope". Thus is generally determined by the temperature characteristics of the amplifier and whether the amplifier is being used in its noninverting mode or in its inverting mode.

It has been discovered that the sign of the slipe can be easily changed if a "floating" diode element is included in the voltage divider to provide the compensating voltage. If the feedback connection is made to the diode anode, the thermal slope will be negative while a connection to the diode cathode will provide a positive thermal slope.

A "zero-offset" feature can easily provided by connecting a potentiometer in parallel with a portion of the divider circuit including the diode and tying the potentiometer wiper to a common reference source. By appropriate adjustment of the potentiometer, the bias of the diode can be controlled at a value which tends to zero the amplifier output.

In an alternative embodiment, a zener diode is connected in parallel with the potentiometer to stabilize the voltage drop across the potentiometer. This feature increases the adjustment range of the potentiometer but at a slightly higher cost and current requirement.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

DESCRIPTION OF THE PREFERRED EMBODIMENTS

Figures 1, 2, 3:
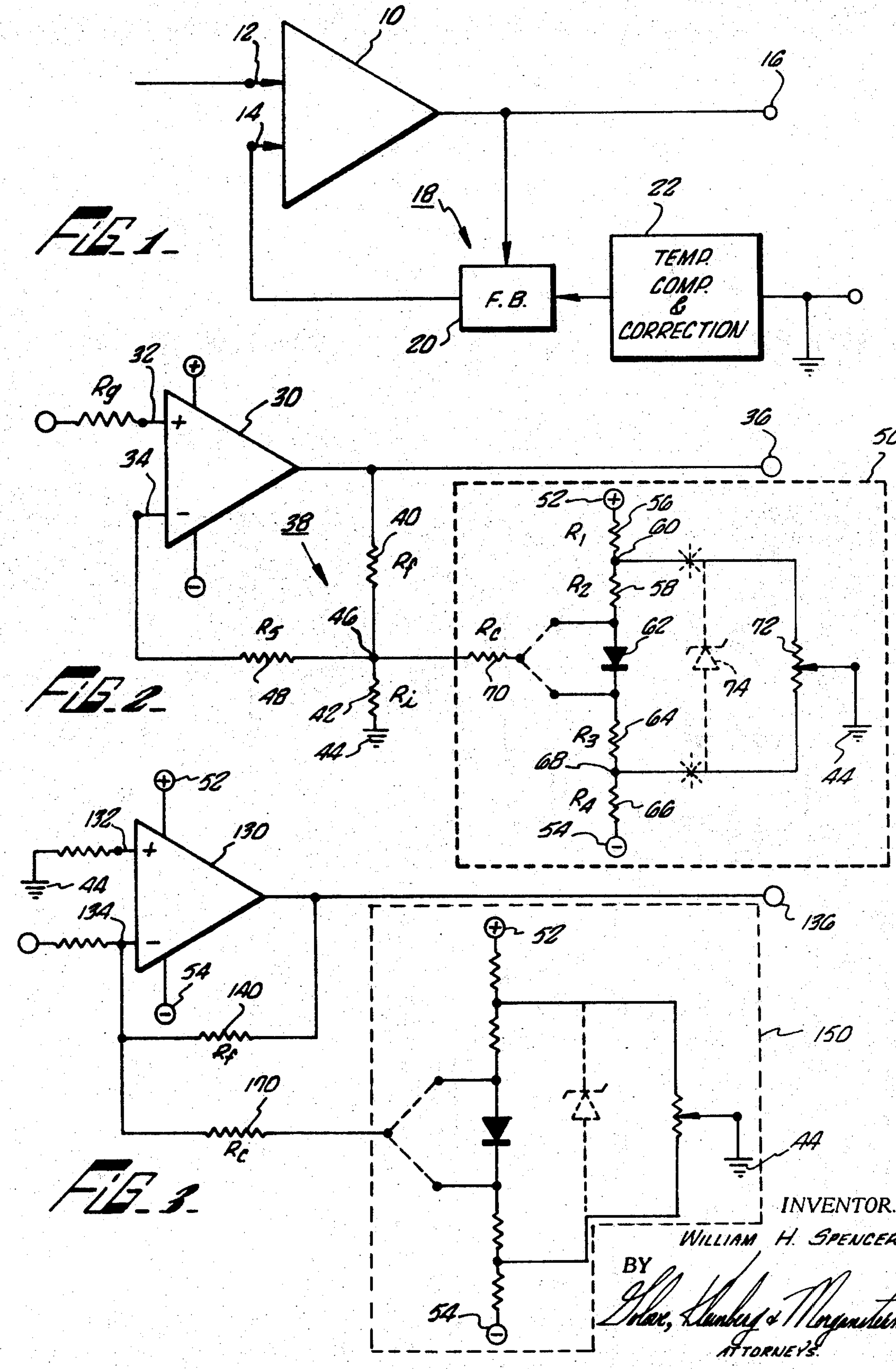
FIG. 1 is a block diagram of an operational amplifier circuit shown with a feedback loop and the compensating circuit of the present invention.
FIG. 2 is a more detailed diagram, partly block, partly circuit, showing the compensating circuits of the present invention applied to an operational amplifier connected in the noninverting mode of operation.
FIG. 3 is a diagram, partially block, partially schematic, showing the compensating circuit of the present invention in conjunction with an operational amplifier in the inverting mode.

Turning first to FIG. 1, there is shown a more or less conventional operational amplifier 10 having an input terminal 12, a feedback terminal 14, and an output terminal 16. A feedback loop 18 connects the output of the amplifier 10 through a feedback circuit 20 to the feedback terminal 14. A temperature compensation correction circuit 22 applies a signal directly to the feedback loop which, when applied to the feedback terminal 14, acts to offset and correct for the thermal characteristics of the amplifier 10, which can be empirically determined in advance.

Turning next to FIG. 2, there is shown a combination of an operational amplifier 30 connected in the noninverting mode with the compensating circuit of the present invention connected thereto. As shown in FIG. 2, the amplifier 30 includes a signal input terminal 32 which, in this mode, may be considered the positive terminal, a feedback input terminal 34, the negative terminal, an output terminal 36, and a feedback loop 38. $R_f$ 40 serially connected to a second resistor $R_i$ 42 which in turn is connected to a source of common reference potential 44. A summing node 46 is found between the first and second resistors 40, 42 and is connected through a third resistor $R_5$ 48 to the feedback terminal 34.

The temperature compensation and correction circuits 50 include a source of positive potential 52, a source of negative potential 54, and a series connected voltage divider network. The voltage divider network includes an upper dropping resistor $R_1$ 56 coupled to the relatively positive potential source 52, an upper compensating resistor $R_2$ 58, connected to the resistor $R_1$ 56 at an upper node 60, a floating diode 62 connected to resistor $R_2$ 58, a lower compensating resistor $R_3$ 64, and a lower dropping resistor $R_4$ 66, which is connected to the negative source of potential 54. The lower compensating resistor $R_3$ 64 is connected to the lower dropping resistor $R_4$ 66, at lower node 68.

A pair of terminals from the anode and cathode of the diode 62 are alternatively connected to a gain control resistor $R_c$ 70, which, in turn, is connected to the summing node 46. The anode or cathode connection is selected for a negative or positive slope, respectively.

In compensating for a particular operational amplifier, such as operational amplifier 30, the thermal characteristics of the amplifier must be empirically determined. The thermal characteristic is generally expressed as a plot of output voltage $E_O$ versus temperature, and hopefully, a linear curve can be plotted having a slope whose sign and magnitude can be ascertained. This is best expressed by the equation $$E_O = \pm (dE_O)/(dT) \pm K \tag{1}$$

wherein $E_O$ is the output voltage; $(dE_O)/dT$ is the change of voltage with temperature; and K represents a dc offset value.

A compensating voltage must be created having the following characteristics:

$$E_c = \mp (dE_c)/(dT) \mp K \tag{2}$$

wherein $E_c$ is the compensating voltage; and $(dE_c)/(dT)$ is the change in voltage of the compensating circuit with temperature. If $E_c$ is applied to a properly scaled summing network, then the amplifier will be substantially insenstivie to changes in temperature.

The value of the temperature compensating resistance can then be determined:

$$R_{tc} = -\Delta V_c \times G \times (R_f)/(\Delta E_O \tag{3}$$

with the constraint that $R_{tc}$ is a positive quantity; where $\Delta V_c$ represents the net change in the correcting potential over the temperature range; and $G$ represents the gain of the amplifier. This gain is a function of the resistance of the feedback loop. $R_f$ is the effective resistance between the output and the summing node, and $\Delta E_O$ is the change in output voltage over the temperature range of interest.

Since for any amplifier in a given circuit the quantities $V_c$, $G$, $R_f$ and $\Delta E_O$ can be determined, the value of $R_{tc}$ can then be computed. For purposes of determining the gain of the correcting signal, and assuming that the amplifier is being operated in the noninverting mode, the amplifier gain $G$ is then a function of $R_f$ 40 and $R_i$ 42, and can be expressed $$G = (R_f + R_i)/(R_i) \tag{4}$$

The gain of the temperature compensation signal is expressed by $$G_{tc} = -R_f/R_{tc} \tag{5}$$

The resistor $R_5$ 48 is used to balance the source impedance.

The effective temperature compensating resistance, $R_{tc}$ is determined by the effective value of several resistance elements connected in series with $R_c$ 70.

$$R_{tc} = [(R_1 + R_2) \cdot (R_3 + R_4)]/[R_1 + R_2 + R_3 + R_4] + R_c \tag{6}$$

Since a value for $R_{tc}$ can be empirically determined from Equation (3), above, it is then possible to select appropriate values for the resistors comprising the voltage divider of the temperature compensating network 50.

The values of $R_1$ and $R_4$ 56, 66, are chosen to place a desired potential drop across $R_2$ 58, the diode 62 and $R_3$ 64, and are partially determined by the magnitude of the positive and negative sources 42, 54.

Also shown in FIG. 2, is a zero correcting potentiometer 72 which is connected in parallel with the upper and lower compensating resistors $R_2$ 58 and $R_3$ 64. The wiper of the potentiometer is connected to the common potential source 44. By adjustment of the wiper, the dc level at which the diode 62 "floats" can be varied and accordingly, a signal can be injected into the feedback loop 38 to zero the amplifier 30.

In an alternative embodiment, a zener diode 74 can be placed in parallel with the potentiometer 72 to stabilize the voltage drop across the potentiometer 72 and the diode 62. Although this adds to the cost of the circuit and requires slightly more current, it does permit utilization of the full range of the potentiometer 72.

Turning finally to FIG. 3, there is shown yet another alternative embodiment of an operation amplifier 130, connected to operate in the inverting mode. As shown, a first, noninverting terminal 132 is connected through an appropriate resistor to a source of common potential. The signal input is applied to the second or inverting terminal 134. The output of the amplifier 130 is applied to an output terminal 136.

A temperature compensating network 150, substantially identical to that shown in FIG. 2, is connected in parallel with a feedback signal taken from the output of the amplifier 130. This feedback is provided by a feedback resistor $R_f$ 140. The correcting signal from temperature compensation circuit 150 is applied through a gain control resistor $R_c$ 170.

In this configuration, the amplifier gain is a function of $R_f$ and $R_i$ different from that expressed in equation 4 supra. In this circuit gain can be represented as:

$$G = (-R_f)/(R_i) \tag{7}$$

In this embodiment, the output signal as well as the gain controlling feedback signal and the temperature compensating feedback signal are all applied to the inverting input terminal of the amplifier, and the output signal is determined accordingly.

Thus, there has been shown, in several embodiments, an improved temperature compensation and zero-offset circuit suitable for use with operational amplifiers. A diode having a temperature sensitive characteristic is utilized in a voltage divider and the voltage at the diode is determined through the use of a potentiometer in parallel with the diode whose wiper is connected to common. Depending upon whether a positive or negative slope is necessary to compensate for the termperature sensitivity of the amplifier itself, a connection is made either to the diode, cathode, or anode, respectively.

What is claimed as new is:

1. In an amplifier having an input, an output, and a feedback loop from the output, a temperature compensating and zero setting circuit comprising:

a first voltage divider adapted to be connected arross a difference in potential;

a diode interposed in the voltage divider circuit and poled in the direction of easy conductivity;

a second voltage divider circuit in series with a portion of said voltage divider and in parallel with said diode;

adjustable wiper means adapted to couple said second voltage divider circuit to a common potential source; and coupling means connecting the diode to the feedback loop for applying to the feedback loop a signal complementary to the thermal drift of the amplifier for substantially cancelling the effects of thermal drift on the amplifier.

2. The circuit of claim 1, above, further including a zener diode connected in parallel with said second voltage divider circuit and poled in the direction opposite to that of easy conductivity.

3. The circuit of claim 1, above, wherein said first voltage divider is selected to have a thermal characteristic with a slope similar to the empirically determined slope of the thermal characteristic of the amplifier.

4. The circuit of claim 1, above, wherein a positive or negative thermal characteristic is achieved by alternatively connecting said coupling means to the cathode and anode of said diode, respectively.

5. In an amplifier having an inverting and a noninverting input and an empirically determined thermal characteristic having a first slope, means for compensating for the thermal characteristic comprising:

a voltage divider circuit having an upper branch and a lower branch;

a diode poled in the direction of easy conductivity coupling said upper and lower branches, said voltage divider providing across said diode, a second thermal characteristic slope;

zero setting means including a second voltage divider circuit connected in series with a portion of said voltage divider circuit and in parallel with said diode and adjustable wiper means adjustably connecting said second voltage divider circuit to a common potential source; and connecting means coupling a one of the anode and cathode of said diode to the inverting amplifier input to provide a compensating signal having a slope of proper sign and magnitude, whereby the thermal characteristic of the amplifier is balanced out by a feedback signal from said voltage divider circuit.

6. The apparatus of claim 5, above, wherein a positive thermal characteristic is corrected for by coupling the diode cathode anode to the inverting input.

7. The apparatus of claim 5, above, wherein a negative thermal characteristic is corrected for by coupling the diode anode to the inverting input.

* * * * *